Figure 1:
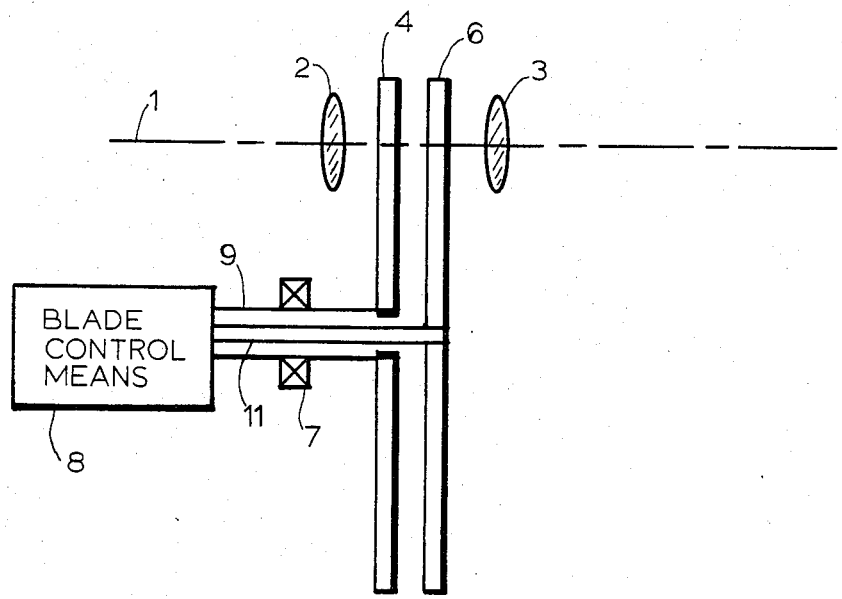

United States Patent [19]

Kunica

[11] Patent Number: 4,536,069
[45] Date of Patent: Aug. 20, 1985

[54] TWO ROTARY BLADE CAMERA SHUTTER

[75] Inventor: Serge Kunica, Wellesley, Mass.

[73] Assignee: Itek Corporation, Lexington, Mass.

[21] Appl. No.: 548,057

[22] Filed: Nov. 2, 1983

[51] Int. Cl.³ .......................... G03B 9/14; G03B 9/22
[52] U.S. Cl. ..................................... 354/265; 352/208
[58] Field of Search ...................... 354/265, 250, 261; 352/208

[56] References Cited

U.S. PATENT DOCUMENTS 3,820,145  6/1974  Gaullier ........................ 352/208 X

*Primary Examiner*—L. T. Hix
*Assistant Examiner*—Douglas S. Lee
*Attorney, Agent, or Firm*—Michael H. Wallach; Robert F. Rotella

[57] ABSTRACT

A first apertured shutter rotates almost a full revolution in a first direction, and a second apertured rotary shutter rotates almost a full revolution in an opposite direction before the apertures of both blades are present at the optical axis to effect exposure, thereby to reduce dynamic disturbances owing to the reduced blade accelerations required.

6 Claims, 9 Drawing Figures

TWO ROTARY BLADE CAMERA SHUTTER

BACKGROUND OF THE INVENTION

The present invention relates to the field of high speed camera shutters.

The interlens space required to accommodate typical prior art multiple rotary disk, high speed camera shutters is in the neighborhood of 0.4-0.5 inches whereas all that is required to accommodate a two blade shutter provided by the present invention, is an interlens space of about 0.2-0.25 inches, thereby to reduce problems in lens design.

It is thus highly desirable to eliminate the need for a three rotary blade shutter along with a fourth capping shutter generally used for low exposure time aerial cameras, and to provide a two blade shutter which performs at least equally well, so that less interlens space is required to accomodate the shutter mechanism. This is extremely important, since the penalties for increasing the interlens space involve the complexity of the optical design required, such as the provision of aspheric optical surfaces and/or the degradation of photgrammetric performance, namely optical distortion.

In U.S. Pat. No. 3,820,145 to Gallier, a two blade rotary disk shutter is provided having apertures which become aligned at the optical axis at some point during the counter rotation of the blades. When an exposure is desired, the blades are caused to rotate in opposite directions through about one half of a revolution, exposure is effected, and the blades are thereafter rotated another half revolution to their light blocking rest position.

It is an object of the present invention to minimize dynamic disturbances e.g. vibration problems, which result from the application of high impulse forces to the shutters to cause them to rapidly accelerate. The present invention reduces the required acceleration because each shutter is accelerated through almost a full revolution, rather than one-half of a revolution as taught by the above mentioned patent. Since acceleration is reduced, the dynamic disturbances are minimized. A significant difference between the '145 patent and the present invention is that the rotary disks therein are always rotated in the same direction whereas in the present invention the direction of rotation of each disk is reversed after each exposure, thereby to provide for almost a full revolution to accelerate and almost a full revolution to deaccelerate the disks to reduce the high impule drive forces along with related dynamic disturbances.

SUMMARY OF THE INVENTION

In accordance with preferred embodiments of the invention, first and said second apertured disks are provided which rotate in opposite directions with respect to each other. To effect an exposure, the blades are accelerated in counter rotation to obtain the desired angular velocity. This velocity is defined by the required exposure time and the velocity profile may be controlled by a servo drive. Almost a full revolution is available for the blades to obtain the required angular velocity, and almost a full revolution is subsequently available after the apertures are aligned at the optical axis to effect exposure, to stop the blades. The availability of this relatively large angular travel to start and stop the blades reduces the peak power requirements and the associated torque and dynamic disturbances to manageable levels. To effect the next exposure, the blades are rotated in the opposite direction, since rotation of the blades in the same direction would result in a premature and much too long exposure. Due to this arrangement, the starting disk shutter positions differ from one cycle to the next, to effect the desirable results.

Other objects, features and advantages of the present invention will become apparent upon study of the following more detailed description, taken in conjunction with the drawings in which:

FIG. 1 illustrates the positioning of the 2 blade shutter along the optical axis; and FIGS. 2 through 9 illustrate the relationships between the rotary shutters as they move through a given exposure cycle.

SPECIFIC DESCRIPTION

Refering now to FIG. 1, optical axis 1 is illustrated, wherein lens system 2 and lens system 3 are positioned thereon. The interlens spacing accommodates a first rotary shutter blade 4 and a second rotary shutter blade 6, such blades being rotatably supported by bearing 7. Blade control means 8 is mechanically coupled to the rotary shutters via shafts 9 and 11. The blade control means forms no part of the present invention and hence has not been illustrated in detail. Blade control means 8 would include a motor and mechanical gearing in order to rotate shaft 9 in one direction and shaft 11 in the opposite direction, thereby to cause opposite rotation of disks 4 and 6. Motor control means contained within the blade control means 8, would also be included to rotate the shafts at the proper time to effect exposure and to cause the shafts to deaccelerate after exposure. One possible gear arrangement for effecting opposite rotation of the disks is illustrated in the above mentioned patent. Other arrangements are well known to those skilled in the art.

Figure 2:
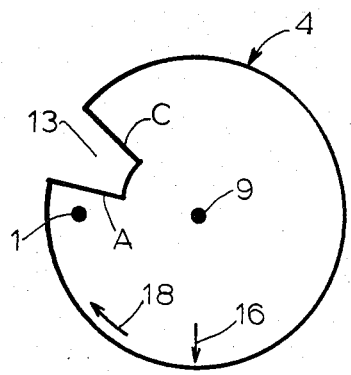
Figure 3:
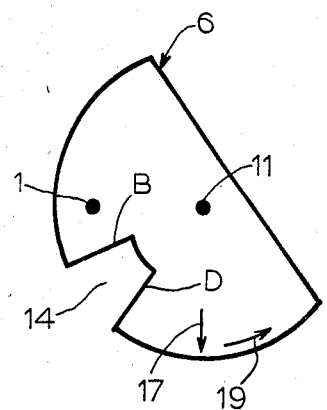
Figure 4:
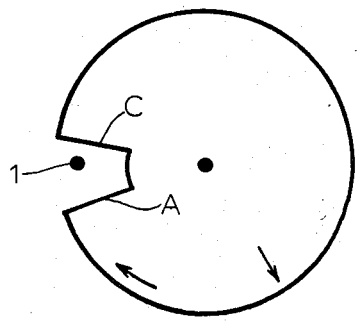
Figure 5:
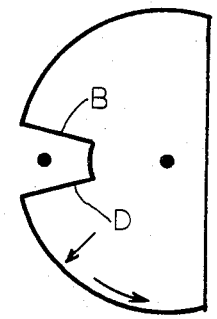

In FIG. 2, a first rotary shutter 4 is illustrated having a first aperture 13 defined by a first aperture edge A and a second aperture edge C. Shaft 9 of FIG. 1 is schematically illustrated positioned at the center of the shutter disk, and optical axis 1 is schematically illustrated as shown. FIG. 3 illustrates the second rotary blade 6 having a second aperture 14 defined by a third aperture edge B and a fourth aperture edge D. Shaft 11 of FIG. 1 is schematically illustrated as shown. While the second shutter blade illustrated in FIG. 3 could consist of a full circle, the blade has been reduced in size since such reduction will not affect the function of the blade, and is desirable since the moment of inertia is reduced, to aid in the lessening of the torque required to accelerate the blade.

In the initial position, optical axis 1 and thus the image light bundle, is covered by a portion of the disk as illustrated in FIG. 2, whereas the optical axis is also covered by the second rotary shutter as shown in FIG. 3. A fiducial mark 16 is illustrated in FIG. 2 to aid the reader in visualizing the various positions assumed by shutter blade 4, whereas fiducial mark 17 is illustrated in connection with the second shutter of FIG. 3. In the initial position assumed by the shutters, the first aperture edge A of the first shutter is nearby the optical axis but the disk is blocking the light, whereas aperture edge B of the second shutter is also adjacent optical axis 1 to cause light blockage and thus apertures 13 and 14 of the shutters are positioned nearby the optical axis but in a light blocking relationship therewith.

As discussed above, it is a highly desirable object of the invention to provide almost a full revolution of the disks before exposure to reduce dynamic disturbances. Disk 4 is accelerated from the initial position in a first rotary clockwise direction, illustrated by arrow 18, whereas disk 6 is rotated in a counterclockwise direction illustrated by arrow 19, in FIG. 2. The disks continue to accelerate until apertures 13 and 14 permit light to be transmitted through the disks when they assume the positions illustrated in FIGS. 4 and 5. It should be noted at this time, as indicated by the changed position of the fiducial arrows, that each disk has rotated through almost a full revolution so that the resulting high speed of the disks will effect a proper desired short exposure. At this time, the first and second aperture edges A and C of disk 4 straddle optical axis 1, whereas the third and fourth aperture edges B and D of rotary disk 6 also straddle optical axis 1.

Figure 6:
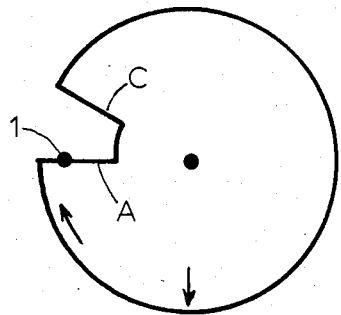
Figure 7:
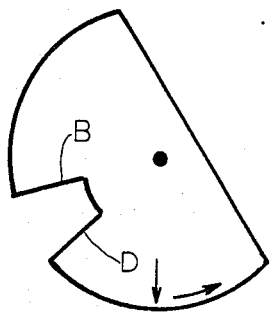
Figure 8:
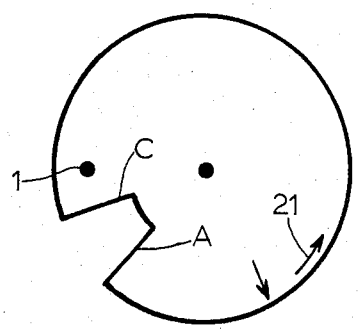
Figure 9:
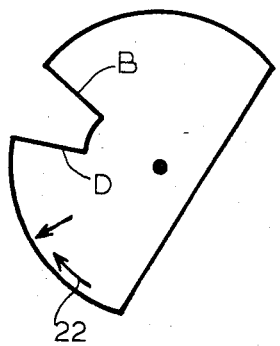

FIGS. 6 and 7 illustrate the positioning of the disks as the light is being cut off and each blade or disk is now deaccelerated by the blade control means 8 until the disks are stopped at approximately the positions shown in FIGS. 8 and 9. It may be noted that as the clockwise rotation of the first disk 4 from the position of FIG. 6 continues, optical axis 1 will be "covered" by the disk to prevent further light transmission through the lens system. This permits the configuration of the second blade 6 to be less than a full circle to reduce its moment of inertia, to in turn reduce drive torque. As may be seen from the fidicial arrow of FIGS. 6 and 8, and the arrow of FIGS. 7 and 9, each disk is rotated, after exposure, almost a full revolution through an angle substantially greater than 180°. In the final rest position of FIGS. 8 and 9, each aperture will be positioned nearby the optical axis approximately as shown, but the positions will be different than the fiducial and aperture positions relative to the optical axis illustrated in FIGS. 2 and 3. This fact is an important aspect of the invention, which provides for acceleration of each disk through an angle substantially greater than 180° before exposure is effected and subsequent disk stoppage. It is also an important aspect of the invention, that the direction of rotation of the blades will now become reversed. To effect the next exposure, the blades are now rotated in the opposite direction from the direction of rotation described above, since rotation of the blades in the same direction would result in a premature and much too long exposure, as the blades cannot be acceleratd fast enough to rapidly uncover and cover the optical axis when they are positioned closely adjacent the axis in the rest position. Thus the first blade 4 is now driven in a counterclockwise direction as indicated by arrow 21 in FIG. 8, and blade 6 commences rotating in a clockwise direction indicated by arrow 22, to start the acceleration process required to get the disks up to speed before exposure. As each disk 4 and 6 rotate through an angle substantially greater than 180°, exposure will again occur since the first and second apertures will coincide at the optical axis, and during the following deaccelerating process the blades will stop in the positions approximately shown by FIGS. 2 and 3, and thus exposure of two images is completed.

In summary, the peak power requirements along with associated torque and dynamic disturbances, are kept at a manageable level, by causing each disk to be accelerated through an angle substantially greater than 180° to minimize the applied acceleration and torque.

While particular embodiments of the present invention have been shown and described, it is apparent that various changes and modifications may be made, and it is therefore intended that the following claims cover all such modifications and changes as may fall within the true spirit and scope of this invention.

I claim:

1. An improved in between lens rotary two blade shutter for interrupting a bundle of light positioned along an optical axis comprising;
    A. a first blade having a first light transmitting aperture therein;
    B. a second blade having a second light transmitting aperture therein;
    C. support means for rotatably supporting said first and second blades;
    D. blade control means for;
        D-1 initially positioning said first aperture to a first side of said optical axis to cause said first blade to intercept said light bundle;
        D-2 initially positioning said second aperture of said second blade to a second opposite side of said optical axis but to the side thereof to cause said second blade to intercept said light bundle;
        D-3 accelerating said first blade in a first rotary direction for causing said first aperture to move away from said optical axis and for accelerating said second blade in a second direction, opposite said first rotary direction, to cause said second aperture to move away from said optical axis so that said first and second apertures become positioned at said optical axis upon rotation of said first and second blades through an angle substantially greater than 180°;
        D-4 deaccelerating said first and second blades after said first and second apertures thereof are positioned at said optical axis for producing stoppage thereof when said first aperture of said first blade is positioned at said second side to cause said first blade to intercept said light bundle, and when said second aperture of said second blade is positioned at said first side of optical axis to cause said second blade to intercept light bundle; and
        D-5 thereafter causing said first blade to become accelerated in said second rotary direction and said second blade to become accelerated in said first rotary direction, for providing rotation of said blades through an angle substantially greater than 180° before said first and second apertures again are positioned at said optical axis to effect transmission of light through said blades.

2. The combination as set forth in claim 1 wherein said support means rotatably supports said blades in a co-axial relationship.

3. The combination as set forth in claim 2 where in said first blade comprises a whole circular disk and said second blade comprises a circular disk with a substantial portion, remote from said second aperature, removed.

4. An improved in between lens rotary two blade shutter for interrupting a bundle of light positioned along an optical axis comprising;
    A. a first blade having a first light transmitting aperture therein;
    B. a second blade having a second light transmitting aperture therein;

C. support means for rotatably supporting said first and second blades;

D. blade control means for;

D-1 initially positioning said first aperture nearby said optical axis but to the side thereof to cause said first blade to intercept said light bundle;

D-2 initially positioning said second aperture of said second blade nearby said optical axis but to the opposite side thereof to cause said second blade to intercept said light bundle;

D-3 accelerating said first blade in a first rotary direction for causing said first aperture to move away from said optical axis and for accelerating said second blade in a second direction, opposite said first rotary direction, to cause said second aperture to move away from said optical axis so that said first and second apertures become positioned at said optical axis upon rotation of said first and second blases through an angle substantially greater than 180°;

D-4 deaccelerating said first and second blades after said first and second apertures thereof are positioned at said optical axis for producing stoppage thereof when said first aperture of said first blade is nearby said optical axis but to the side thereof to cause said first blade to intercept said light bundle, and when said second aperture of said second blade is nearby said optical axis but to the opposite side thereof to cause said second blade to intercept light bundle; and D-5 thereafter causing said first blade to become accelerated in said second rotary direction and said second blade to become accelerated in said first rotary direction, for providing rotation of said blades through an angle substantially greater than 180° before said first and second apertures again are positioned at said optical axis to effect transmission of light through said blades.

5. The combination as set forth in claim 4 wherein said support means rotatably supports said blades in a coaxial relationship.

6. The combination as set forth in claim 5 wherein said first blade comprises a whole circular disk and said second blade comprises a circular disk with a substantial portion, remote from said second aperture, removed.

* * * * *